Patented July 22, 1924.

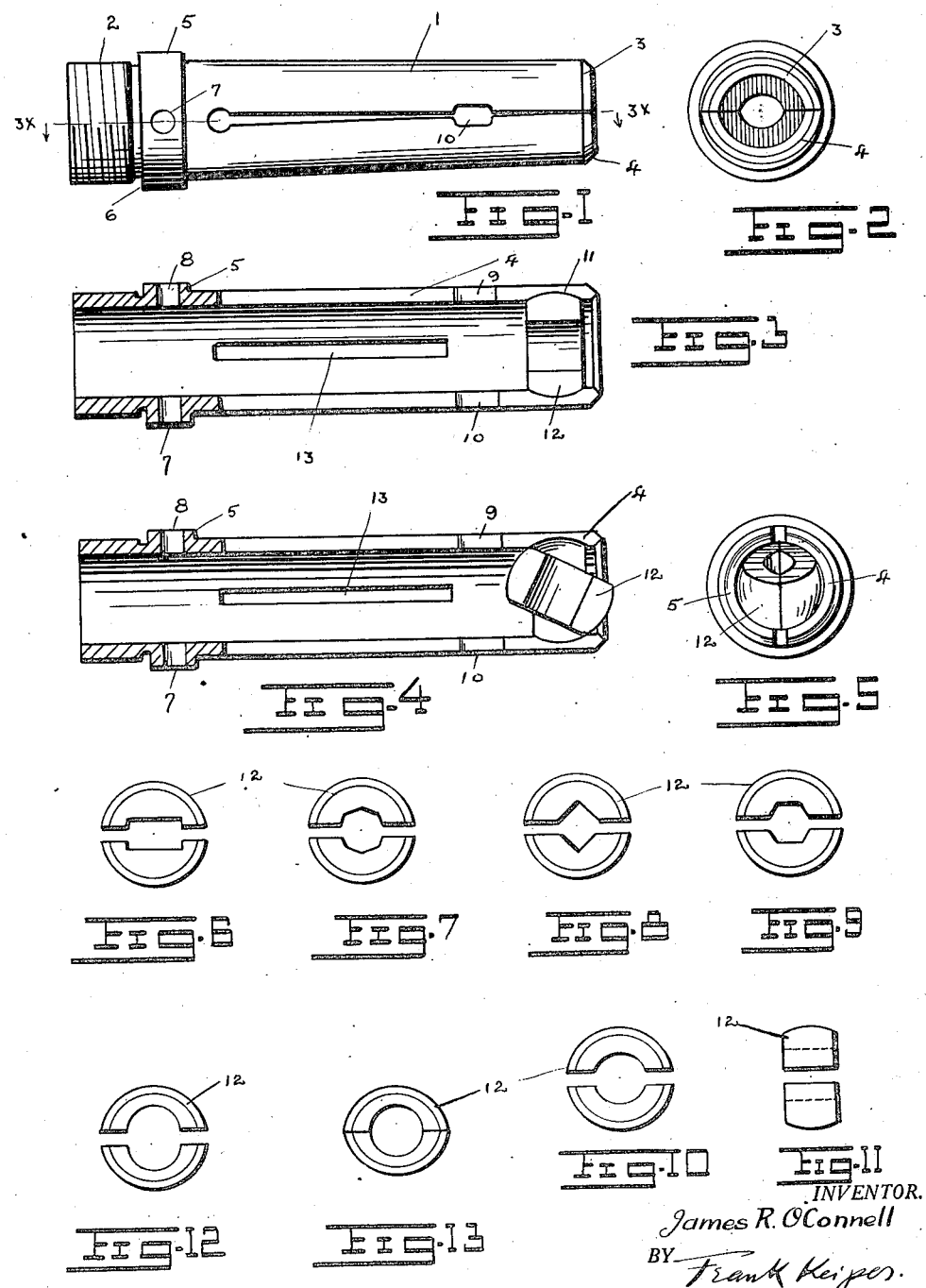

1,502,116

UNITED STATES PATENT OFFICE.

JAMES R. O'CONNELL, OF ROCHESTER, NEW YORK, ASSIGNOR OF ONE-HALF TO JOHN O. BENNETT, OF ROCHESTER, NEW YORK.

FEED CHUCK.

Application filed October 19, 1923. Serial No. 669,485.

*To all whom it may concern:*

Be it known that I, JAMES R. O'CONNELL, a citizen of the United States, residing at Rochester, in the county of Monroe and State of New York, have invented certain new and useful Improvements in Feed Chucks, of which the following is a specification.

The object of my present invention is to provide a new and improved form of feed chucks for use in automatic screw machines and other machines in which a chuck of this kind is used.

This and other objects of this invention will be fully illustrated in the drawing, described in the specification and pointed out in the claims at the end thereof.

In the accompanying drawing:

Figure 1 is a side elevation of the improved feed chuck.

Figure 2 is an end elevation of the improved feed chuck.

Figure 3 is a longitudinal sectional view of the feed chuck the section being taken on the line $3^x$—$3^x$ of Figure 1.

Figure 4 is a longitudinal sectional view of the feed chuck, the bushing thereof being shown in the position in which it has to be inserted into the body or withdrawn from the body of the feed chuck.

Figure 5 is an end view of the feed chuck and bushing illustrated in Figure 4.

Figures 6 to 13 inclusive are detail views of a series of bushings and modifications thereof used in connection with the feed chuck.

In the several figures of the drawings like reference numerals indicate like parts.

The feed chuck forming the subject matter of my present invention is an improvement over the feed chucks that are at present used in screw machines for the purpose of feeding the rod stock to be operated upon through the spindle into the collet of the machine and advance this stock through the collet after each cut off operation which severs the finished product from the end of the continuous rod stock. A new section of the rod stock is thus fed into the machine by the feed chuck and held in place therein by the collet ready to have the tools of the machine operate on it.

For this purpose the feed chuck must be constructed in a manner that will provide a firm grip for the chuck on the stock to be fed into the machine. Heretofore such chucks were made of a single piece, that is, the body as well as the gripping members of the chuck were made integral with each other. This necessitated an uneven hardening and tempering of the chuck so that the body thereof was left springy and consequently softer than the gripping member proper which had to have a degree of hardness that would prevent excessive wear thereof. The uneven hardness thus present in the body of the chuck made the chuck weak at the dividing line between its hard and soft section and this eventually caused the breaking of it after a comparatively short life of operation.

The feed chuck forming the subject matter of my present invention overcomes this drawback in the construction of feed chucks by making the body of the chuck and the chuck proper in two parts so that the body of the chuck can be hardened evenly throughout its length to secure the best possible result necessary for the spring action of the chuck while the chuck or gripping members can be hardened to a degree that will prevent a quick wear thereof without in any way weakening any part of the chuck as a whole.

As illustrated in the figures of the drawing the body 1 of the feed chuck is formed up from a section of tubing having a male thread 2 provided at one end thereof and a pair of semicircular gripping fingers 3 and 4 provided at the other end thereof. A collar 5 is formed between the threaded end and the gripping fingers of the chuck and provides a shoulder 6 that is adapted to rest against the end of the feed bar after the chuck is threaded thereto. A pair of holes 7 and 8 allow a handle (not shown) to be inserted into the body of the chuck for the purpose of rotating it to attach the chuck or take it off from the end of the feed bar.

The pair of semicircular gripping fingers 3 and 4 are formed by slitting the body of the chuck for a considerable length thereof and then bringing the slitted ends together at the outer end as illustrated in Figures 1 and 2. The widths of the slits in the body of the chuck thus determines the amount the fingers can spring from their normal to their gripping position. As illustrated in Figures 1, 3 and 4, the slits in the body of the chuck are enlarged at 9 and 10 to allow a flattened tool such as a screw driver to be inserted therein. This is necessary when it is desired to spread the gripping fingers which is accomplished by turning the screw driver in the enlarged sections 9 and 10 of the slits until the fingers are sprung apart into the position illustrated in Figures 4 and 5 for a purpose that will presently appear.

Near the forward end, and on the inside thereof, the gripping fingers are provided with a concave channel 11. This channel is formed in the gripping fingers before the body of the chuck is slitted as above pointed out and is therefore concentric with the body of the chuck. The inside diameter of the channel 11 and its curvature is in dimensions the same as that of the outside of the bushings 12 that form the chuck or gripping members proper and are held in place in the channel 11 as will now be described.

Each of the bushings 12 is made up in two sections and formed by slitting a solid bushing with a slit slightly smaller in width than the slit with which the body 1 of the chuck is slitted. The hole in the center of the bushings may have any desired diameter and outline as illustrated in Figures 6 to 10 inclusive, the particular size and shape of the hole to be used being determined by the cross section of the rod stock to be fed into the machine by the feed chuck.

To insert one of the bushings 12 the gripping fingers of the body of the chuck are sprung apart as above described and as illustrated in Figures 4 and 5. After this is done the two sections of the bushing 12 to be inserted are inserted endways between the fingers until the convex outer diameter thereof rests in the concave channel 11 as illustrated in Figures 4 and 5. The sections of the bushings can then be turned in the channel 11 until the hole of the bushing is in line with the hole in the body of the chuck.

The spring fingers are then released so that they grip the sections of the bushing 12 by forcing them together as illustrated in Figure 2. This also holds the bushing against endwise movement within the fingers. The fact that the width of the slit that divide the sections of the bushing 12 is less than the width of the slits in the body of the chuck allows the spring fingers of the chuck to firmly hold the sections of the bushing 12 together. In the insertion of the sections of the bushing 12 it is of course essential that the slits in the body of the chuck between the spring fingers are in line with the slit that divides the bushing 12 into two sections and forms the gripping fingers in order to allow the sections of the bushing to open or close with the opening or closing of the spring fingers.

As above pointed out the hole in the center of the bushings 12 is preferably concentric with the periphery of the bushing. When therefore the sections of the bushing are spread apart and a size rod stock is inserted therein that holds the bushing in the extreme opened position in which the hole in the center of the bushing, the periphery of the bushing and the inside diameter of the concave channel inside of the gripping finger are concentric with one another it is possible for the bushing sections to rotate within the gripping fingers that will bring the dividing lines of the bushing sections out of line with the slits between the gripping fingers. To overcome this the holes in the center of the bushing can be drilled or formed after the finished blank of the bushings has been divided into the two sections so that the holes in the bushings will not be concentric with the outside diameter of the bushings. In this way the spreading of the bushing by the rod stock when inserted into the hole of the bushing will not spread the sections to a point where the outside diameter of the bushing will form a true circle that is concentric with the channel 11 in which the bushing is held in place and this eccentricity between the outside of the bushing and the inside of the channel 11 will prevent the turning of the sections of the bushing within the gripping fingers.

For the purpose of providing more resiliency for the spring fingers the body 1 of the chuck may be provided with one or more slots 13 that may be evenly spaced apart from each other parallel to the slits that divide the spring fingers. These slots reduce the metal stock of each of the fingers increasing the flexibility in consequence thereof.

I claim:

1. In a feed chuck, the combination of a tubular body member, a pair of spring fingers formed at one end of said tubular body section, a radial channel formed on the inside of said spring fingers, a pair of gripping members adapted to be inserted between said spring fingers, said gripping members having a spherical perimeter corresponding to the inside diameter and outline of said radial channel, said radial channel being adapted to engage and hold said gripping members against endwise movement within said spring fingers.

2. In a feed chuck, the combination of a tubular body member, said body member being divided longitudinally into two sections to form a pair of spring fingers at one end thereof, a radial channel formed on the inside of said spring member, a chuck member comprising a pair of jaws, said jaws forming a divided bushing having a spherical perimeter, said bushing being adapted to be inserted between said spring fingers and be held against endwise movement within said radial channel.

3. In a feed chuck, the combination of a tubular body member, said body members being divided longitudinally into two sections to form a pair of spring fingers at one end thereof, a radial channel formed on the inside of said spring member, a chuck member comprising a pair of jaws, said jaws forming a divided bushing having a spherical perimeter, said bushing being adapted to be inserted between said spring fingers and be held against endwise movement within said radial channel, the outline of the hole in said divided bushing being eccentric to the outline of the perimeter of said divided bushing and said radial channel.

In testimony whereof I affix my signature.

JAMES R. O'CONNELL.